US008938568B2

(12) United States Patent
Kanigicherla et al.

(10) Patent No.: US 8,938,568 B2
(45) Date of Patent: Jan. 20, 2015

(54) MULTI-PROCESSOR ELECTRONIC SYSTEMS

(75) Inventors: Balaji Kanigicherla, Hyderabad (IN); Siva Raghu Ram Voleti, Hyderabad (IN); Kirshna Mohan Tandaboina, Hyderabad (IN); Dhanumjai Pasumarthy, Hyderabad (IN)

(73) Assignee: Ineda Systems Pvt. Ltd, Hyderabad, Andhra Pradesh (IN)

( * ) Notice: Subject to any disclaimer, the term of this patent is extended or adjusted under 35 U.S.C. 154(b) by 0 days.

(21) Appl. No.: 13/817,815

(22) PCT Filed: Aug. 19, 2011

(86) PCT No.: PCT/IN2011/000559
§ 371 (c)(1),
(2), (4) Date: Feb. 19, 2013

(87) PCT Pub. No.: WO2012/023152
PCT Pub. Date: Feb. 23, 2012

(65) Prior Publication Data
US 2013/0151840 A1 Jun. 13, 2013

(30) Foreign Application Priority Data
Aug. 19, 2010 (IN) .......................... 2398/CHE/2010

(51) Int. Cl.
*G06F 3/00* (2006.01)
*G06F 13/42* (2006.01)
(Continued)

(52) U.S. Cl.
CPC ................ *G06F 13/36* (2013.01); *G06F 9/461* (2013.01); *G06F 2213/0038* (2013.01)
USPC ............. 710/313; 710/11; 710/105; 710/314; 710/315

(58) Field of Classification Search
USPC ........................... 710/313, 11, 105, 314, 315
See application file for complete search history.

(56) References Cited

U.S. PATENT DOCUMENTS 7,886,177 B2 * 2/2011 Bennett et al. ................ 713/502
8,656,198 B2 * 2/2014 Branover et al. ............. 713/323
(Continued)

OTHER PUBLICATIONS

PCT Notification of Transmittal of the International Search Report and the Written Opinion of the International Searching Authority, or the Declaration for PCT Counterpart Application No. PCT/IN2011/000559 containing International Search Report, 16 pgs. (Mar. 20, 2012).

(Continued)

*Primary Examiner* — Idriss N Alrobaye
*Assistant Examiner* — Gentente A Yimer
(74) *Attorney, Agent, or Firm* — Workman Nydegger

(57) ABSTRACT

Disclosed herein is a system having a multi-processor configuration for electronics devices and systems, such as, computing and communication devices like laptop, notebook, tablets, smartphones, etc. In accordance with one embodiment of the subject matter the system comprises a plurality of processors and a multi protocol multi-root input output virtualization (MPMRIOV) switch communicatively coupled to at least one of the plurality of processors. The system further includes a peripheral and interface virtualization unit (PIVU) coupled to the MPMRIOV switch. In said embodiment, the PIVU is configured to communicatively couple at least one of the plurality of processors with at least one of a Peripheral Component Interconnect (PCI) compliant peripheral, a Peripheral Component Interconnect express (PCIe) compliant peripheral, a non PCI compliant peripheral, and a non PCIe compliant peripheral.

15 Claims, 10 Drawing Sheets

(51) Int. Cl.
*G06F 13/36* (2006.01)
*G06F 9/46* (2006.01)

(56) References Cited

U.S. PATENT DOCUMENTS

| | | | |
|---|---|---|---|
| 2006/0206655 A1* | 9/2006 | Chappell et al. | 710/315 |
| 2007/0198656 A1 | 8/2007 | Mazzaferri et al. | |
| 2009/0063747 A1* | 3/2009 | Bagepalli et al. | 710/313 |
| 2009/0235105 A1* | 9/2009 | Branover et al. | 713/330 |
| 2009/0276773 A1 | 11/2009 | Brown et al. | |
| 2010/0105454 A1 | 4/2010 | Weber et al. | |
| 2010/0153615 A1 | 6/2010 | Baba et al. | |
| 2011/0185163 A1* | 7/2011 | Hidaka | 713/2 |
| 2012/0110233 A1* | 5/2012 | Higuchi et al. | 710/313 |

OTHER PUBLICATIONS

PCT Notification of Transmittal of International Preliminary Examination Report for PCT Application No. PCT/IN2011/000559, 90 pgs. (Nov. 16, 2012).

* cited by examiner

MULTI-PROCESSOR ELECTRONIC SYSTEMS

CROSS-REFERENCE TO RELATED APPLICATIONS

This patent application is a U.S. National Phase Application under 35 U.S.C. §371 of International Application No. PCT/IN2011/000559, filed Aug. 19, 2011, entitled MULTI-PROCESSOR ELECTRONIC SYSTEMS, which claims priority to India Patent Application No. 2398/CHE/2010, filed Aug. 19, 2010.

TECHNICAL FIELD

The present subject matter, in general, relates to electronic systems and in particular to multi-processor electronic systems.

BACKGROUND

Advancement in the fields of information technology (IT) and computer science has made computing and communication devices an integral part of human life. Conventional devices have become more handy and compact and users prefer carrying them at all possible times. Examples of portable computing and communication devices are laptops, palmtops, notebooks, tablet PCs, personal digital assistants (PDAs), smartphones, etc. These devices come in varying sizes and processing power and have an in-built power source, for example, rechargeable batteries. The batteries can be recharged using a power adapter, docking station, etc., from a power supply.

In recent years, the processing capabilities of computing devices have enhanced greatly. Increased processing power means increased energy consumption, which in turn means higher capacity batteries. However, this may increase the weight of the devices, which is not desirable. If existing batteries are continued to be used, they will get discharged quickly owing to the increased processing power of these devices and, therefore, would require frequent charging. Charging is not always possible at all places, especially when a user of such a device is on the move.

Taking into consideration these facts, one can understand the tradeoff between the processing power and the battery life when designing a computing device. However market demands seldom allow such a compromise as there will always be a desire for electronic devices that not only give high processing speed but also last long in terms of battery life.

SUMMARY

This summary is provided to introduce concepts related to multi-processor electronic systems and the concepts are further described below in the detailed description. This summary is neither intended to identify essential features of the claimed subject matter nor is it intended for use in determining or limiting the scope of the claimed subject matter.

In accordance with one embodiment of the subject matter described herein, the system comprises a plurality of processors and a multi protocol multi-root input output virtualization (MPMRIOV) switch communicatively coupled to at least one of the plurality of processors. The system further includes a peripheral and interface virtualization unit (PIVU) coupled to the MPMRIOV switch. In said embodiment, the PIVU is configured to communicatively couple at least one of the plurality of processors with at least one of a Peripheral Component Interconnect (PCI) compliant peripheral, a Peripheral Component Interconnect express (PCIe) compliant peripheral, a non PCI compliant peripheral, and a non PCIe compliant peripheral

BRIEF DESCRIPTION OF DRAWINGS

The above and other features, aspects and advantages of the subject matter will be better understood with regard to the following description and accompanying drawings, where.

DETAILED DESCRIPTION

Figure 1:
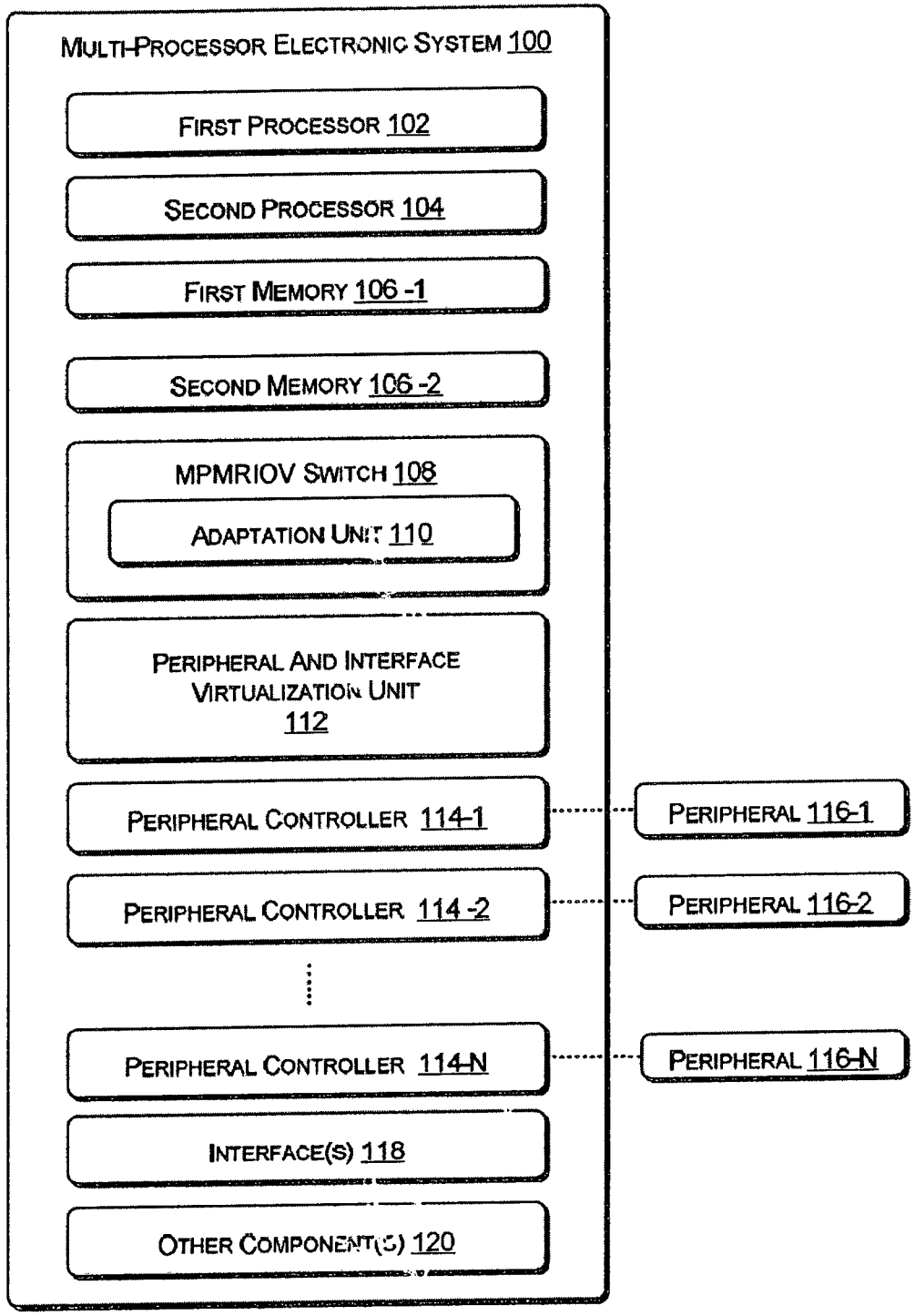
FIG. 1 illustrates exemplary components of a multi-processor electronic system, according to an embodiment of the present subject matter.

The present subject matter relates to a multi-processor electronics devices and systems, such as, computing and communication devices. Examples of computing and communication devices and systems, hereinafter collectively referred to as devices, include laptops, palmtops, notebooks, tablet PCs, personal digital assistants (PDAs), smartphones, etc.

Numerous devices, ranging from high end devices that are rich in features and possess high processing capabilities to the ones that possess basic communication and computing capabilities, are conventionally available. While the former consume a lot of power and are therefore usually preferably operated when connected to a power supply, the later is preferred in portable applications owing to longer battery backup they allow.

With the increased popularity of portable devices, sophisticated portable devices having powerful processors and superior features are in great demand. While the devices having powerful processors cater to the versatile needs of the users, they exhaust the battery rapidly. This imposes a restriction that devices have to be carried around along with their power adapters or docking station, etc., for recharging the in-built battery, resulting in reduced mobility of the portable device and inconvenience of the users.

Certain solutions have been proposed and are currently used to address this problem. One such solution involves incorporating power schemes in operating systems of the electronic systems. These power schemes introduce different operational states like dormancy, sleep, standby, etc., which usually involves operating a component or a combination of components of the electronic systems at a capacity lower than its rated capacity. For example, certain power schemes throttle down the processor speed when running low end applications or reduce the brightness of the display. However, power schemes have limited success as a majority of components, like hard disk, etc., still run at rated capacity.

In another approach the solution involves incorporating multiple operating systems in a multi-processor electronic system. However this solution usually requires the user to switch off one operating system before switching on another. Also, these solutions do not allow simultaneous sharing of peripherals hence redundant peripherals have to be provided, resulting in increased costs as well as power consumption. Also the systems implementing these solutions make the system bulky and expensive due to hardware redundancy. Additionally, switching time, which is the time taken to switch from one operating system to another operating system, is high for these conventional systems.

To this end, the present subject matter describes a multi-processor electronic system, hence forth referred to as the system, which enhances battery life of the system without compromising on processing capabilities. The system can run multiple operating systems on multiple processors concurrently and allows simultaneous sharing of peripherals. The system also synchronizes essential data between the multiple operating systems running on multiple processors. This enables the seamless switching between operating systems. Seamless switching allows the user to continue his work without interruption; even if the operating system is changed. The system is cost effective as it is optimized to increase the utilization of peripherals, like input output devices (I/O devices) and reduce hardware redundancy The system, according to an embodiment of the present subject matter, comprises at least a first host processor, a second host processor, memory coupled to each of the processors, an intelligent peripheral controller unit, henceforth referred to as IPCU, electronically connected to the host processors, at least one interface to facilitate connection and communication with external systems, peripherals, networks, etc., wherein at least one of the connected peripherals facilitate user interaction with the system. The peripherals are also referred to as input output devices (I/O devices). In one implementation, the second host processor is located inside the IPCU.

In one embodiment, a high end operating system is run on the first host processor and a low end operating system is run on the second host processor. Thus, as evident the high end operating system running on the first host processor has higher processing ability, more features but has higher power consumption as compared to the low end operating system running on the second host processor. The mode of operation of the high end operating system may be referred to as the high power mode while that of the low end operating system may be referred to as low power mode. However, in one embodiment, the low end operating system may be run on the first host processor and the high end operating system may be operated on the second host processor. Yet in another embodiment, the same operating system may be run on both the first host processor and the second host processor, without limiting the scope of the present subject matter.

Additionally, the system may be configured to identify the applications which can be run in the low power mode, without compromising on quality and user experience, and may automatically switch from the high power mode to the low power mode whenever such applications are executed. In another embodiment, the system may operate in both the high power mode and the low power mode concurrently and may be configured to run applications on either the high power mode or the low power mode based on the requirements of the applications, thus optimizing power consumption and enhancing battery life. In another example, the system may keep the low mode operational by default, for normal tasks, and switch to the high power mode only when the requirement arises, for example, due to launching of an application by the user.

Any one of the high end operating system or the low end operating system can be designated as the primary operating system i.e. the operating system that is by default loaded onto the system when the system is booted. The user has the facility to designate and change the primary operating system as per choice and/or requirement.

The system has provision for concurrently running either the high end operating system or the low end operating system or both the high end operating system and the low end operating system. For example, while running a high end application requiring higher hardware resource support, the high end operating system on the first host processor may be run, whereas in case of a low-end application, the low end operating system on the second host processor may be utilized. To optimize power consumption, the device has been configured to switch the user from the high end operating system to the low end operating system without any data or work interruption giving the user a seamless switching experience. The switching from the high end operating system to the low end operating system and vice-versa may either be performed by the system automatically or as a response to an external event like loss of external power source, undocking from the charging or docking station, etc., or be triggered by the user input either through hardware or software. However, the user has the option of continuing in the high power mode even while running on in-built power source at the cost of reduced battery life.

In order to reduce hardware redundancy, the system facilitates the sharing of the system resources and peripherals among the operating systems running on the first host processor and the second host processor simultaneously. The system is designed to be used with peripheral component interconnect (PCI) compliant, peripheral component interconnect express (PCIe) compliant, non-PCI compliant and non-PCIe compliant peripherals.

For example, the system may include or may be connected to various storage controllers, like Serial Advanced Technology Attachments (SATA), NAND flash memory, multimedia cards (MMC), Consumer Electronics Advanced Technology Attachment (CEATA); connectivity modules like baseband interfaces, Serial Peripheral Interfaces (SPI), Inter-integrated Circuit (I2C), infrared data association (IrDA) compliant devices; media controllers like camera, integrated inter chip sound (I2S); media accelerators like audio encode-decode engines, video encode-decode engines, graphics accelerator; security modules like encryption engines, key generators; communication modules like bluetooth, Wi-Fi, Ethernet; universal serial bus (USB) connected devices like pen drives, memory sticks, etc.

The system can be implemented as various types of electronic systems and is not restricted to only portable electronic system. For example, in one embodiment, the system may be a workstation or desktop, etc. Though the system has been described as having two processors, it should be appreciated that the present subject matter can be extended to systems having more than two processors. These and other features and advantages of the system will be further described in conjunction with the following figures and embodiments.

FIG. 1 shows the exemplary components of the system 100, according to an embodiment of the present subject matter. The system 100 can either be a portable electronic device, like laptop, notebook, netbook, tablet computer, etc., or a non-portable electronic device like desktop, workstation, server, etc.

The system 100 comprises a first host processor 102 and a second host processor 104. When the system 100 is booted, a primary operating system is loaded. In one example, the first operating system, referred to as OS-A, running on the first host processor 102 may be designated as the primary operating system while the second operating system, referred to as OS-B, running on the second host processor 104 is treated as the secondary operating system. If multiple operating systems are present, the system 100 allows the user to designate any of the operating systems as the primary operating system. The user can change the primary operating system according to user's choice and/or requirement. The system 100 also allows the user to switch from one operating system to another operating system seamlessly. The system 100 can concurrently run multiple operating systems on the first host processor 102 and the second host processor 104. The first host processor 102 and the second host processor 104 are coupled to a first memory 106-1 and a second memory 106-2 respectively.

The system 100 includes a multi-protocol multi-root input output virtualization (MPMRIOV) switch 108, which facilitates the communication of the system 100 with connected peripherals 116-1, 116-2, . . . 116-N, collectively referred to as peripherals 116. It may be mentioned that Peripheral Component Interconnect Special Interest Group (PCI-SIG), an electronics industry consortium responsible for specifying the Peripheral Component Interconnect (PCI) and Peripheral Component Interconnect Express (PCIe) computer buses, states multi-root input output virtualization (MRIOV) as the industry standard for enabling connectivity of peripherals among multiple processors.

The system 100 comprises a MPMRIOV switch 108 and peripheral and interface virtualization unit (PIVU) 112, which is configured to facilitate communication with peripherals 116, that may be PCI, PCIe, non-PCI and non-PCIe compliant peripherals, attached with the processors 102 and 104. The PIVU 112 enables connectivity with non-PCI and non-PCIe compliant devices by implementing the PCI/PCIe register sets. The PIVU 112 is coupled to a plurality of peripheral controllers 114-1, 114-2, . . . 114-N, collectively referred to as peripheral controllers 114. The peripheral and interface virtualization unit 112 helps in virtualization of the physical devices and facilitates simultaneous sharing of devices, like printers, keyboard, mouse, display unit, etc., among multiple operating systems or multiple processors. The system 100 may also include other components 120 required to provide additional functionalities to the system 100.

The peripherals 116 can be configured to be used exclusively by either of the first host processor 102 or the second host processor 104 or by both the first host processor 102 and the second host processor 104 simultaneously. Additionally the system 100 has one or more interfaces 118 to connect to external network, systems, peripherals, devices, etc.

In the afore going description, although the system 100 has been depicted as a two processor system, it should be appreciated the same can be extended to all systems having a plurality of processors.

Figure 2:
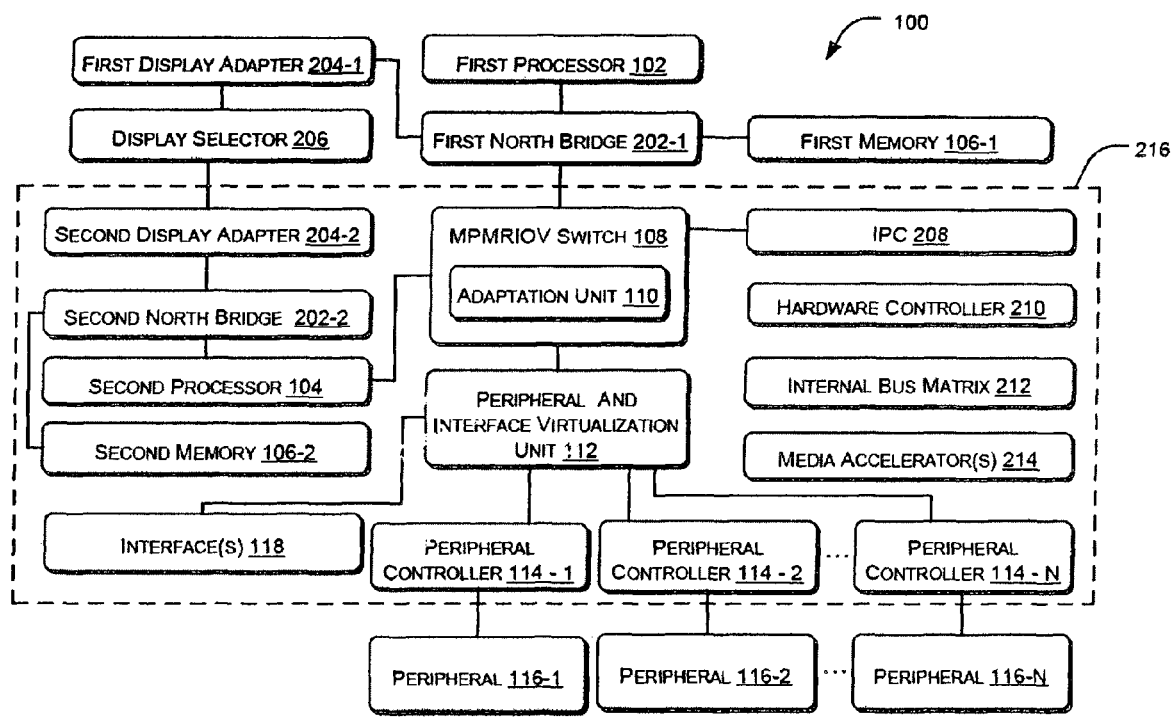
FIG. 2 illustrates exemplary components of the multi-processor electronic system, according to another embodiment of the present subject matter.

FIG. 2 shows the exemplary components of the system 100, according to another embodiment of the present subject matter. The system 100 further comprises a first north bridge 202-1 that connects the first host processor 102 with the first memory 106-1 and facilitates communication between a first display adapter 204-1 and the first host processor 102. The display adapter 204-1 transmits display or video signals to an external visual display unit (not shown in the figure). The first north bridge 202-1 is connected to an intelligent peripheral controller unit (IPCU) 216. In one implementation, the IPCU 216 is connected to the first north bridge 202-1 through another component like a south bridge or an input/output controller hub or an equivalent thereof.

The IPCU 216 includes the MPMRIOV switch 108 which adheres to the standards set by PCI-SIG. The MPMRIOV switch 108 comprises an adaptation unit 110 which facilitates communication with peripherals 116 and host interfaces like advanced extensible interface (AXI), advanced high performance bus (AHB), which may be non-PCI or non-PCIe compliant.

In one embodiment, the IPCU 216 may include the second host processor 104, having a second north bridge 202-2, which facilitates connection of the second host processor 104 to the second memory 106-2 and a second display adapter 204-2. The IPCU 216 helps in simultaneous sharing of peripherals 116 among the first host processor 102 and the second host processor 104. Integrating the second host processor 104 in the IPCU 216 reduces power consumption and chip area thus making the system 100 more economic and compact. In other implementations the second host processor 104 may be outside the IPCU 216. Also the second host processor can be configured to share the first memory 106-1 with the first host processor 102.

The first host processor 102 and the second host processor 104 can be implemented as one or more microprocessors, microcomputers, microcontrollers, digital signal processors, central processing units, state machines, logic circuitries, or any devices that manipulate signals based on operational instructions. Among other capabilities, the first host processor 102 and the second host processor 104 can be configured to fetch and execute computer-readable instructions and data stored in either of the first memory 106-1 or the second memory 106-2.

The first memory 106-1 and the second memory 106-2 can include any computer-readable medium known in the art including, for example, volatile memory (e.g., RAM) and/or non-volatile memory (e.g., flash, etc.). The first memory 106-1 and the second memory 106-2 may include module and data. The module usually includes routines, programs, objects, components, data structure, etc., that perform particular task or implement particular abstract data types.

The IPCU 216 also includes an inter processor communication unit (IPC) 208 for exchange of messages between the first host processor 102 and second host processor 104, an internal bus matrix 212 for communicating with various system resources, at least one media accelerator 214 for enhancing media processing like audio processing, at least one hardware controller 210 to interact with system resources, the peripheral controllers 114 and the peripheral and interface virtualization unit 112. The IPCU 216 may also include other components required to provide additional functionalities to the system 100.

In the said embodiment the system 100 includes a display selector 206, which facilitates control and flow of display signals from the first display adapter 204-1 and the second display adapter 204-1 to a visual display unit (not shown in figure). The visual display unit includes but is not limited to cathode ray tube (CRT) monitors, liquid crystal display (LCD) screens, plasma screens, projectors, high-definition multimedia interface (HDMI) compliant devices, video graphics array (VGA) compliant devices etc. Other embodiments with integrated display adapter or visual display unit or both are also possible.

Figure 3:
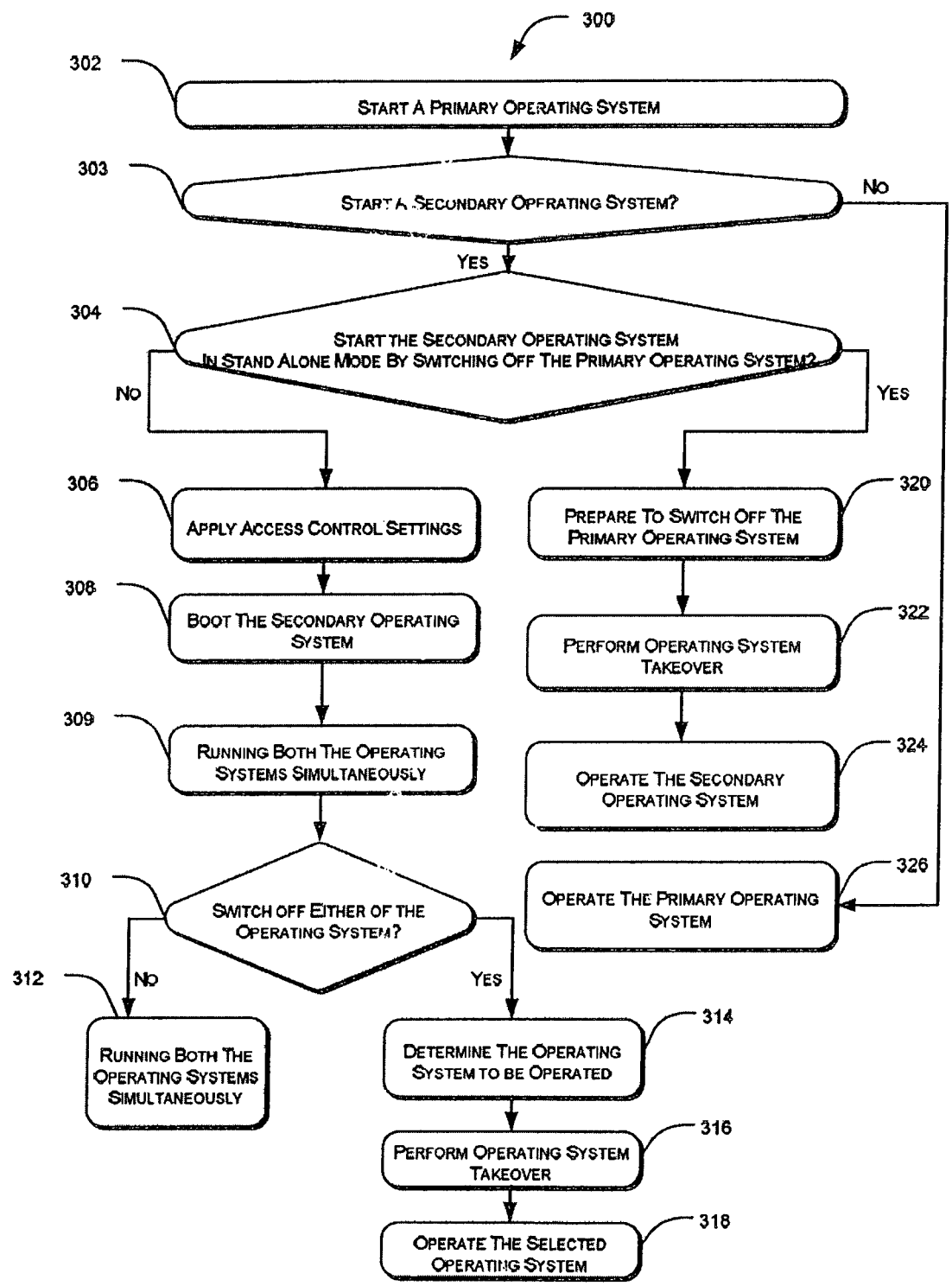
FIG. 3 illustrates an exemplary method of switching from one operating system to another in a multi-processor electronic system, according to an embodiment of the present subject matter.

FIG. 3 illustrates an exemplary method 300 for switching between the operating system OS-A and the operating system OS-B, in accordance with an embodiment of the present subject matter. The exemplary method may be described in the general context of computer executable instructions. Generally, computer executable instructions can include routines, programs, objects, components, data structures, procedures, modules, functions, etc., that perform particular functions or implement particular abstract data types. The method may also be practiced in a distributed computing environment where functions are performed by remote processing devices that are linked through a communications network. In a distributed computing environment, computer executable instructions may be located in both local and remote computer storage media, including memory storage devices.

The order in which the method 300 is described is not intended to be construed as a limitation, and any number of the described method blocks can be combined in any order to implement the method, or an alternative method. Additionally, individual blocks may be deleted from the method without departing from the spirit and scope of the subject matter described herein. Furthermore, the method can be implemented in any suitable hardware, software, firmware, or combination thereof. The method is presently provided for switching from one operating system to another.

When the system 100 boots the primary, i.e. the default, operating system, say operating system OS-A on the first host processor 102, as shown in block 302, the primary operating system becomes fully operational. However, in another embodiment the operating system OS-A may be operated on the second processor 104 and the operating system OS-B may be run on the first processor 102.

At block 303, the user is provided with an option of selecting to start a secondary operating system. Since the system 100 is initially started with one operating system, as depicted in block 302, the system 100 is operated in a single operating system mode. In said mode, only one operating system is operational and thus no sharing of peripherals is required. The secondary operating system, for example operating system OS-B, may run on the second host processor 104.

If the user input to start the other operating system is positive, at block 304 the user is given the option to start the secondary operating system either in stand alone mode, where operating system OS-B is operated alone, or in dual mode, where operating system OS-A and operating system OS-B are operated simultaneously. If the user input to start the other operating system is negative, the system continues operating single operating system, as shown by block 326.

If the dual mode i.e. simultaneous running of both operating system OS-A and operating system OS-B is selected at block 304, at block 306, the system 100 applies access control settings. Access control settings determine whether the peripherals 116 can be used by either of the operating system OS-A and OS-B or both. The user can modify the access control settings as per his preference. Access control setting also define whether the operating systems OS-A and OS-B can access a device exclusively or in shared mode by permitting access to the peripheral register space accordingly. Access control settings may also deny either of the operating systems OS-A and OS-B the access to one or more peripherals 116.

The system 100 then boots the other operating system OS-B, as illustrated in block 308. The method proceeds to block 309 where the operating system OS-A continues to run along with OS-B. At block 310, an indication to switch off either of the operating systems OS-A and OS-B is received from the user. If the user does not opt for switching off either of the operating systems OS-A and OS-B, the system 100 runs both the operating systems OS-A and OS-B simultaneously, as illustrated at block 312.

Once the user provides an input to the system 100, at block 310, indicating that one of the operating system OS-A and the operating system OS-B is required to be switched, at block 314 the system 100 determines the operating system which is to be kept operational based on the users preference. Based on the user preference, as illustrated in block 314, an operating system takeover takes place at block 316. The mechanism of operating system takeover is described in detail later in the specification. Operating system takeover allows the selected operating system to remain active and, as shown in block 318, the system operates the selected operating system in single operating system mode.

In the event of the user selecting to start the secondary operating system in stand alone mode, the system 100 prepares for the switching off of the operating system OS-A, as shown in block 320. As a result, at block 322, operating system takeover, similar to the one described with respect to the block 316, occurs. In effect, the operating system OS-A is deactivated and only the operating system OS-B remains active, as shown in block 324, and the system returns to single operating system mode. It will be appreciated by one skilled in the art that though the method 300 has been explained with reference to two operating systems, the same concept can be extended to systems having more than two operating systems.

Figure 4:
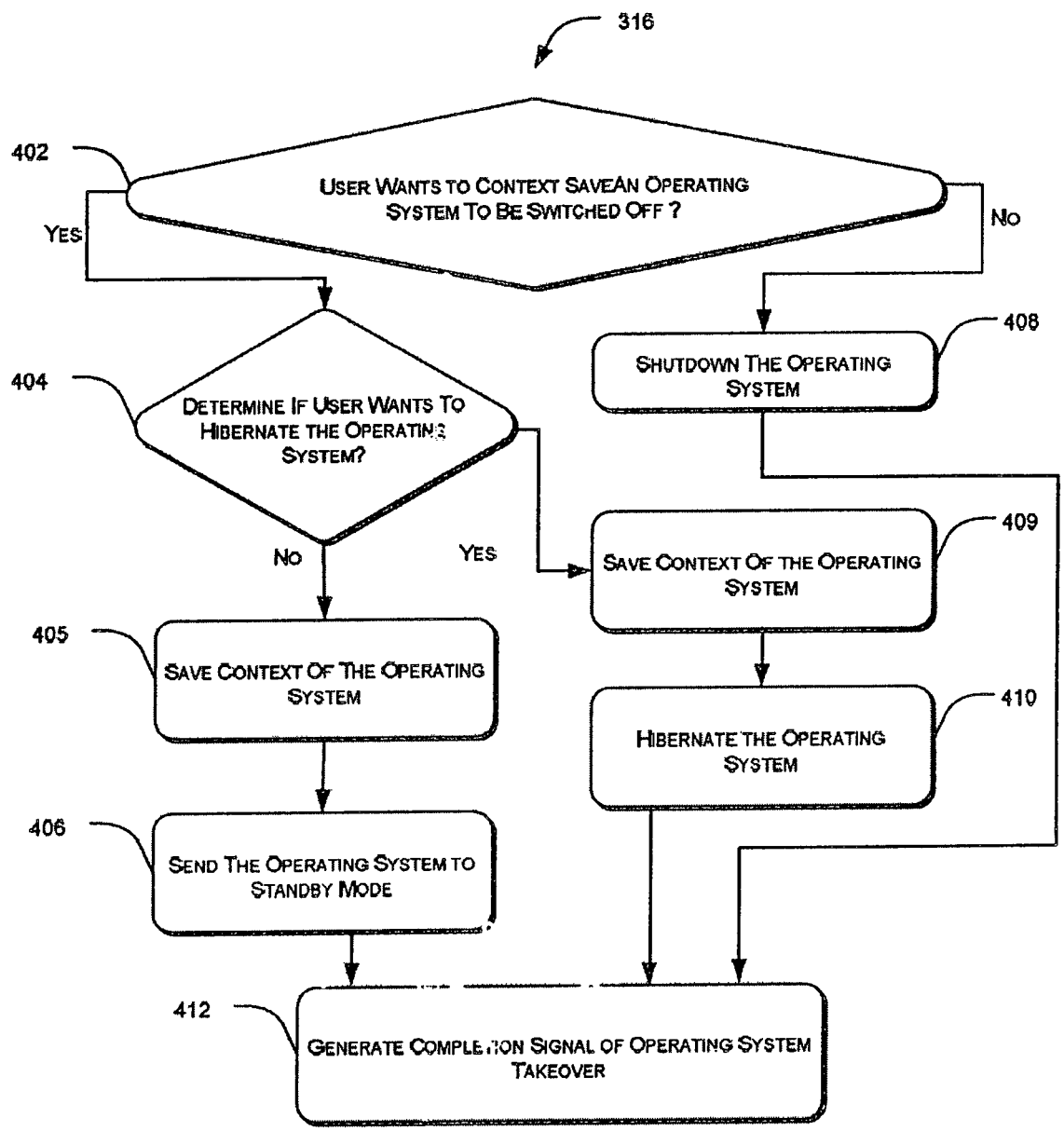
FIG. 4 illustrates an exemplary method of operating system takeover in a multi-processor electronic system, according to an embodiment of the present subject matter.

FIG. 4 illustrates an exemplary method of operating system takeover 316, according to an embodiment of the present subject matter. For explanatory purpose, the method of operating system takeover 316 is explained in context of method 300.

The exemplary method 316 may be described in the general context of computer executable instructions. Generally, computer executable instructions can include routines, programs, objects, components, data structures, procedures, modules, functions, etc., that perform particular functions or implement particular abstract data types. The method may also be practiced in a distributed computing environment where functions are performed by remote processing devices that are linked through a communications network. In a distributed computing environment, computer executable instructions may be located in both local and remote computer storage media, including memory storage devices.

The order in which the method 316 is described is not intended to be construed as a limitation, and any number of the described method blocks can be combined in any order to implement the method, or an alternative method. Additionally, individual blocks may be deleted from the method without departing from the spirit and scope of the subject matter described herein. Furthermore, the method can be implemented in any suitable hardware, software, firmware, or combination thereof. The method is presently provided for operating system takeover.

Operating system takeover occurs either as a response to an external event, like undocking from docking station, etc., or based on user input. For example, in case of loss of external power supply, due to undocking, etc., the system 100 switches to the low power mode, wherein the operating system OS-B operates on the second processor 104. The system 100 gives the user a seamless transition experience and the user can continue working without any interruption. For example, the user may be browsing a web page in the internet using a web browser in the operating system OS-A. Now, if the system 100 switches to the operating system OS-B, the user can continue browsing the same webpage from the same state it was in at the time of exiting the operating system OS-A. Switching to the second processor 104 allows the battery life of the system 100 to be extended. However, the user has the option of using the system 100 in the high power mode even when the system 100 is running on the in-built power source at the cost of battery life.

In another embodiment the system 100 may be configured to automatically switch to the low power mode, while performing tasks which do not need high processing power and/or background support from the operating system. For example, consider an example where an audio file is played in the high power mode. This consumes more power as compared to playing the audio file in low power mode. This is because high power mode uses the first processor 102 which has higher processing capability than the second processor 114 and operates operating system OS-A which has more features, background and system related services than OS-B. However, the system is configured to identify that the application being run in the high power mode, i.e. the audio file in the above example, may be run in the low power mode with equal quality. Thus the system 100 may automatically enable switching to low power mode whenever such an opportunity exists to reduce power consumption. This optimizes power consumption without compromising the processing power of the system 100 resulting in reduced energy consumption than a conventional electronic system. This dynamic switching is advantageous when the system is running on battery as this helps in enhancing battery life.

Operating system takeover may occur in various ways. Method 316 illustrates one scheme of achieving operating system takeover.

The method 316 is initiated by receiving an indication of switching down either the operating system OS-A or OS-B from the user. In response, at block 402, the system 100 provides the user a context save option. In other words the user is provided the option of saving the context of the operating system to be switched off. In one implementation, the context saving may optionally involve context exchange procedure (not shown) which includes transferring necessary information from one operating system session to another, so that the end user can continue his task without any interruption, so as to give a seamless switching experience. Context saving and context exchange can be implemented by hardware or software or a combination of both.

If the user input received in response to the context save option is negative, the system 100 proceeds to shutdown the operating system at block 408. Upon completion of the shutdown, the system 100 generates a completion signal of operating system takeover at block 412.

On the other hand, if the user chooses to context save the operating system to be switched off, at block 404, the system 100 gives the user the option of hibernating the operating system that is being switched off.

If the user selects to hibernate the operating system, the system 100 saves the context of the operating system as shown in block 409 and proceeds to hibernate the operating system as shown in block 410 and generates a completion signal of operating system takeover as shown in block 412. In case, the user does not opt to hibernate the operating system, the system 100 saves the context of the operating system at block 405 and proceeds to sends the operating system to standby mode at block 406 Upon attainment of the stand by mode by the operating system, the system 100 proceeds to block 412 to generate a completion signal signifying operating system takeover.

When the operating system takeover happens, the control of certain peripherals like visual display unit is switched from one operating system to the other operating system.

Figure 5:
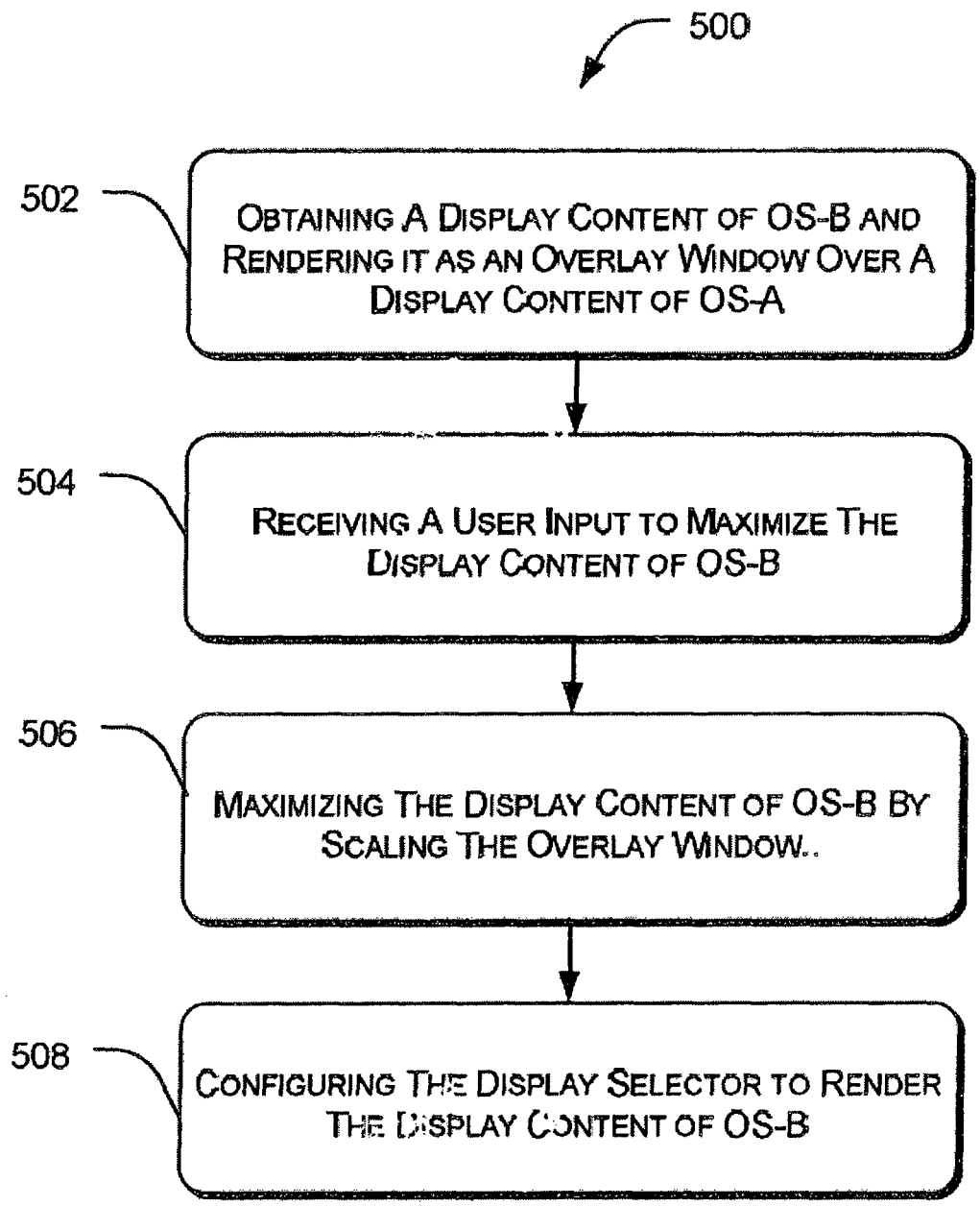
FIG. 5 illustrates an exemplary method of display sharing in a multi-processor electronic system, according to an embodiment of the present subject matter

FIG. 5 illustrates an exemplary method 500 of switching the display from shared mode to exclusive mode, according to an embodiment of the present subject matter. The exemplary method may be described in the general context of computer executable instructions. Generally, computer executable instructions can include routines, programs, objects, components, data structures, procedures, modules, functions, etc., that perform particular functions or implement particular abstract data types. The method may also be practiced in a distributed computing environment where functions are performed by remote processing devices that are linked through a communications network. In a distributed computing environment, computer executable instructions may be located in both local and remote computer storage media, including memory storage devices.

The order in which the method 500 is described is not intended to be construed as a limitation, and any number of the described method blocks can be combined in any order to implement the method, or an alternative method. Additionally, individual blocks may be deleted from the method without departing from the spirit and scope of the subject matter described herein. Furthermore, the method can be implemented in any suitable hardware, software, firmware, or combination thereof.

The system 100 has the provision of operating both the operating systems, operating system OS-A on the first processor 102 and operating system OS-B on the second processor 104, simultaneously. Hence the visual display unit (not shown in figure) is configured to share the display among the operating system OS-A and operating system OS-B concurrently. The display sharing can be done either in an exclusive mode or a shared mode.

In exclusive mode, the visual display unit shows one of the operating systems at a time, while the other operating systems run in the background. The switching of the display from one operating system to another may occur as a result of the operating systems takeover process. However, the switching may also be triggered by a user input either through hardware or software or both. The switching is achieved by selecting either a signal from the first display adapter 204-1 or the second display adapter 204-2 to be routed to the visual display unit.

In shared mode the display of one operating system, say operating system OS-B, is overlaid on the display of the other operating system, say operating system OS-A, usually in the form of a partition or a popup window or an overlay window. For doing this, the first operating system OS-A reads the display content of the second operating system OS-B. For the purpose, operating system OS-A can either pull the display content of operating system OS-B or operating system OS-B can push its display content to the first memory 106-1, which is used by the first processor 102 to run operating system OS-A. Obtaining the display content by either of the above mentioned methods is coordinated by the IPC 208 which facilitates the inter-processor communication between the first processor 102 and the second processor 104.

At block 502, operating system OS-A obtains the display content of operating system OS-B and renders the content as an overlay window on a visual display unit through the first display adapter 204-1.

In block 504 the system identifies a user input for maximizing the display of operating system OS-B. To achieve this, the operating system OS-A maximizes the display of operating system OS-B by scaling with the help of first display adapter 204-1, as depicted in block 506. Simultaneously, the second display adapter 204-2 renders its signal to the display switch 206 irrespective of its selection of display signal.

At block 508, the display selector 206 now selects to render the signals from the second display adapter's 204-2, thus giving the user a smooth and seamless transition.

Figure 6A:
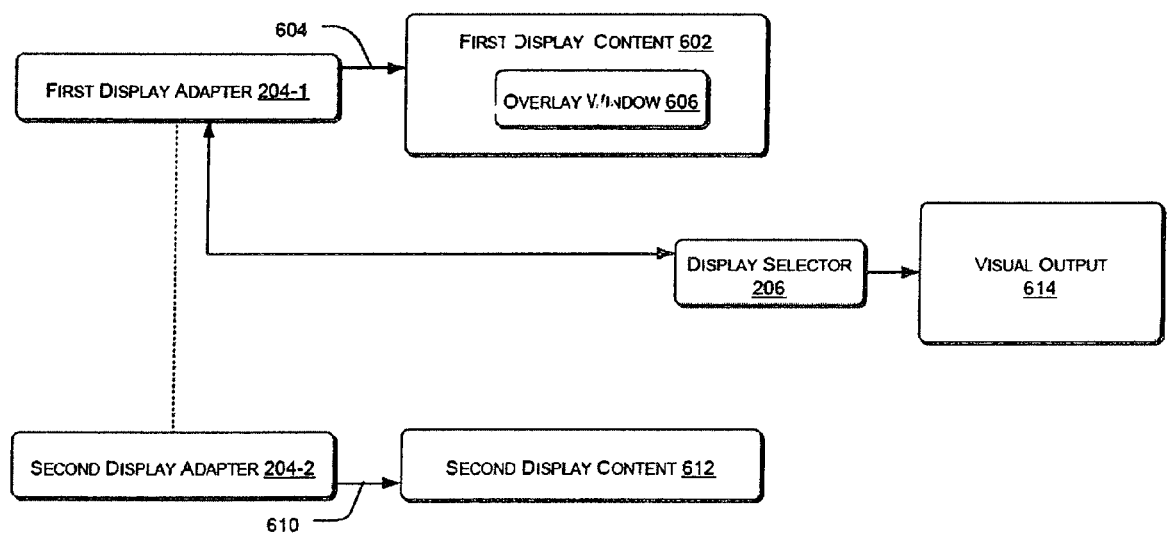
FIGS. 6(a), 6(b), and 6(c) illustrate an exemplary mechanism of display switching in a multi-processor electronic system, according to an embodiment of the present subject matter.
Figure 6B:
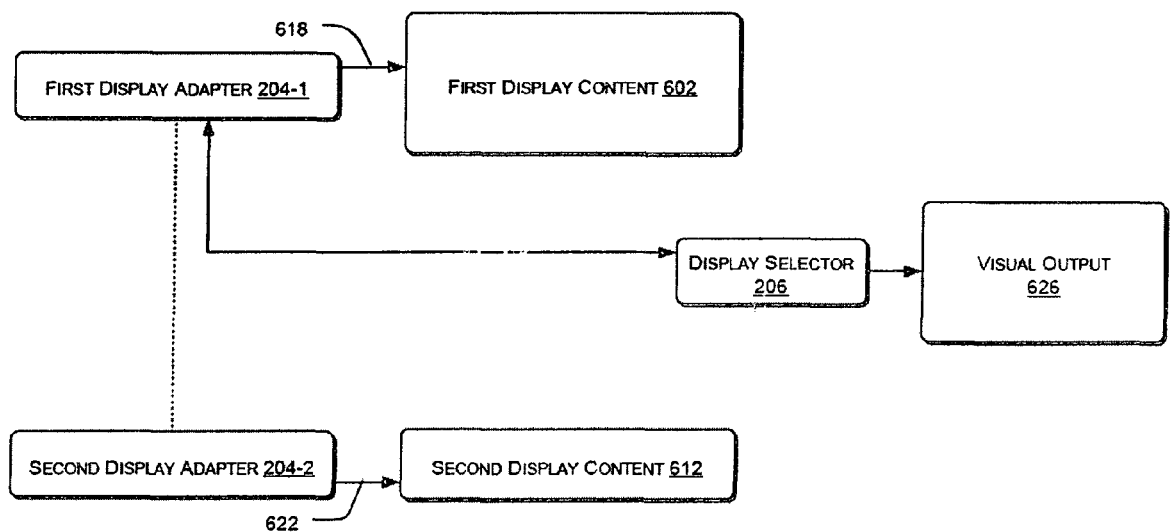
Figure 6C:
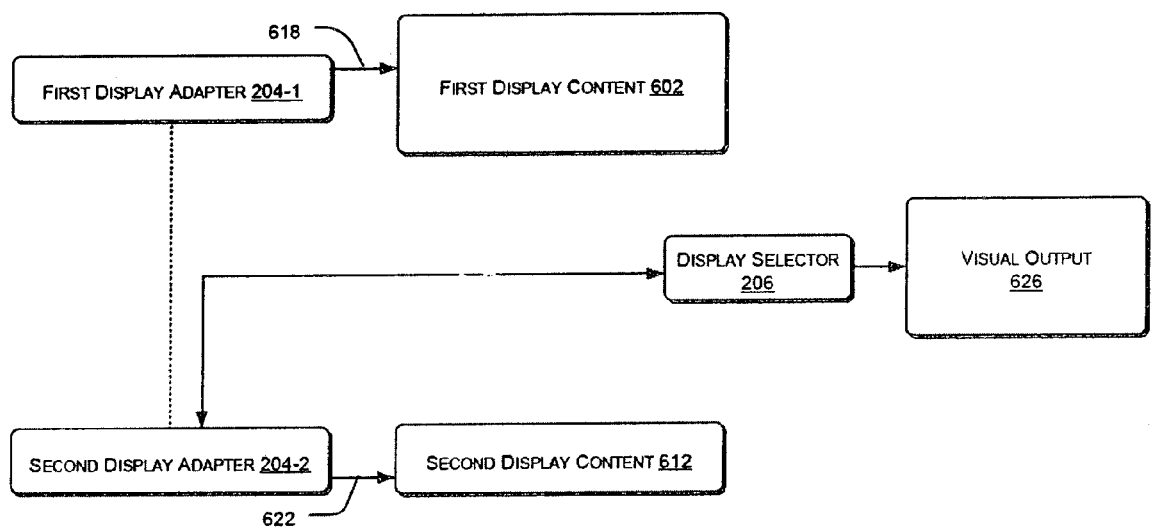

FIGS. 6(a), 6(b), 6(c) illustrate exemplary mechanisms of switching the display from shared mode to exclusive mode and vice-versa, according to an embodiment of the present subject matter.

FIG. 6(a) shows an exemplary situation, where the content to be displayed by the operating system OS-B is being viewed as an overlay window on operating system OS-A's full screen or maximized display. For this the first display adapter 204-1 obtains the display information of the second display adapter 204-2 and designates this as an overlay display. The display selector 206 processes display signals from the first display adapter 204-1 and coordinates communication with the visual display unit (not shown in figure).

The first display adapter 204-1 generates signals 604 that are representative of a first display content 602 whereas the second display adapter 204-2 generates signals 610 which represent a second display content 612. The first and the second display content 602 and 612 are the visual outputs generated by the operating system OS-A and the operating system OS-B respectively.

The IPC 208 facilitates sending the operating system OS-B's display content, present in the second memory 106-2, to the first memory 106-1 via the first processor 102 and the second processor 104. The second display content 612 generated by the second display adapter 204-2 is shown simultaneously with the first display content 602 generated by the first display adapter 204-1 in from of an overlay window 606. The display selector 206 selects the signals generated by the first display adapter 204-1 to be rendered on to the visual display unit which gives a visual output 614.

FIG. 6(b) shows the scenario when the system 100 receives a user input to maximize operating system OS-B's display. The second display adapter 204-2 starts driving the second display content 612 to display selector 206. Meanwhile, operating system OS-A scales the second display content 612 from operating system OS-B to full scale and simultaneously continues transmitting the signals 618 containing the second display content 612 to the visual display unit.

The first display adapter 204-1 generates signals 618 which depict the first display content 602. Similarly the second display adapter 204-2 generates signals 622 which depict the second display content 612. The exchange of display signals is coordinated by IPC 208. The display selector 206 selects the signals generated by the first display adapter 204-1 to be rendered on to the visual display unit, which gives a visual output 626. At this stage, the output of the first display content 602 and the output of the second display content 612 are the same. In order to render the display content of the second display adapter directly, the display selector may now be configured to select the second display content as shown in FIG. 6(c).

FIG. 6(c) shows the display selector 206 in accordance with one embodiment of the subject matter. The display selector 206 is configured to select signals 622 from the second display adapter 204-2 and display it on the visual display unit.

The features and advantages of the system 100 are further described in the following embodiment. In this embodiment, the system 100 is a handheld device or a smart phone.

Figure 7:
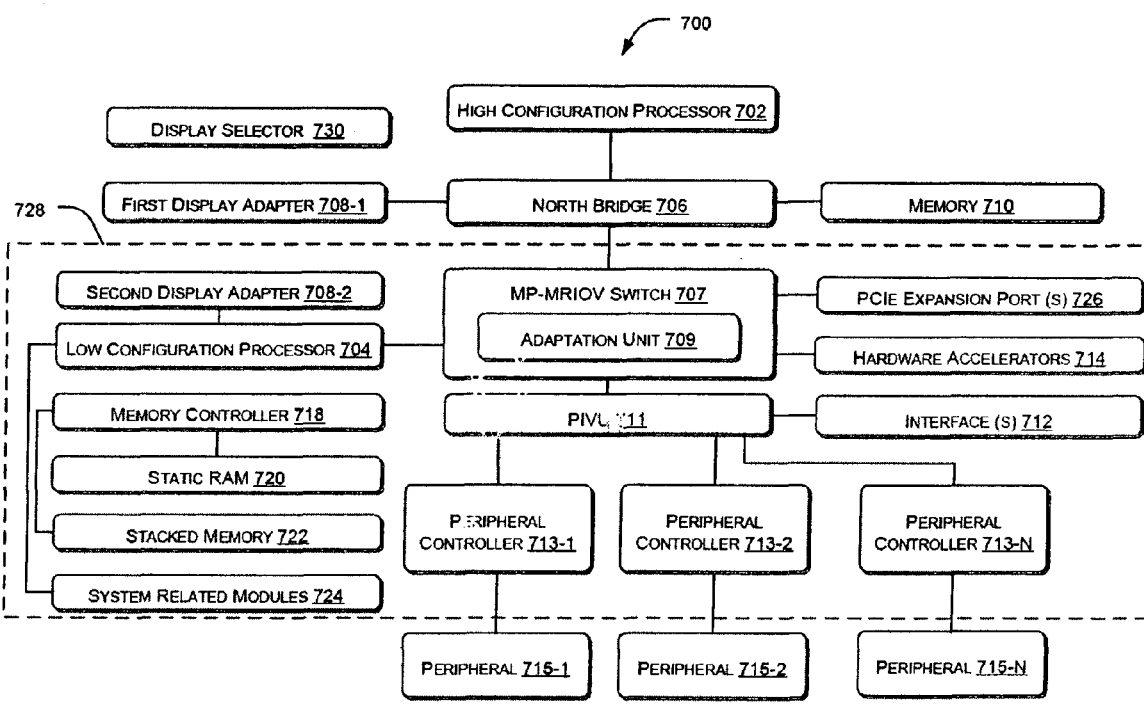
FIG. 7 illustrates an exemplary multi-processor smartphone according to an embodiment of the present subject matter.

FIG. 7 illustrates an exemplary multi-processor smart phone 700, according to an embodiment of the current system. In one embodiment, the system 100 may be implemented as the smart phone 700 and it will be appreciated that the concepts explained in context thereof may be extended to such an implementation.

The smart phone 700 comprises a high configuration processor 702, a memory 710 coupled to the high configuration processor 702, a low configuration processor 704, a MPM-RIOV switch 707, having an adaptation unit 709, one or more hardware accelerator(s) 714, peripheral and interface virtualization unit 711, a plurality of peripheral controllers 713-1, 713-2, ... 713-N, system related module(s) 724 like encryption engines, at least one memory controller 718, static random access memory (SRAM) 720 and stacked memory 722. In the said embodiment, the smart phone 700 has at least one PCIe expansion port 726. The smart phone 700 has at least one interface 712 to connect to cellular networks, a north bridge 706, a first display adapter 708-1 coupled to the high configuration processor 702, a second display adapter 708-2 coupled to the low configuration processor 704 and a display selector 730. The smart phone 700 may include other modules (not shown in figure) enabling it to connect to other devices or network via Bluetooth, infra-red, wireless local area network (WLAN), Wi-Fi, etc. In other embodiments, the smart phone 700 may connect to a plurality of peripherals 715-1, 715-2, ... 715-N, collectively referred to as peripherals 715. For example, peripherals 715 may include other components, like camera, audio/video recorder, global positioning system (GPS), universal serial bus (USB) ports, card reader(s), software tools, etc. . . . .

The various components of the smart phone 700 may be integrated on a single board known as personal computer enabler application processor (PCEAP) 728. The high configuration processor 702 can be placed on the same board as the PCEAP or on a different board or on a different unit as an add-on device or as a part of a docking station. The high configuration processor 702 can also be integrated with the PCEAP 728.

The high configuration processor 702 runs a high end operating system, OS-C, whereas the low configuration processor 704 runs a low end operating system, namely, OS-D. OS-D supports interface(s) 712 facilitating connection to a cellular network. The smart phone 700 also has an in-built power source, like rechargeable batteries (not shown in figure), which can be charged using power adapter, docking station, etc.

When the smart phone 700 is switched on, the low end operating system OS-D is loaded to operate the smart phone 700 in a mobile phone mode. In mobile phone mode the smart phone 700 has all the functionalities of a conventional cellular phone like connecting to a cellular network, support for voice calls, messaging, etc. The smart phone 700 may also run certain other utilities like alarm clock, calendar, music player, camera, audio-video playback, etc., which do not result in quick discharge of the in-built power source like batteries. Since the OS-D runs on the low configuration processor 704, power consumption is reduced resulting in higher battery backup. Further, the OS-D provides support for all conventional cellular phone functions like connecting to at least one cellular phone network, multimedia messaging, short messaging service, voice calls, etc.

However, when the smart phone 700 is connected to an external power supply, the smart phone boots the high end operating system, OS-C, on the high configuration processor 702 is loaded, either by system configuration or user input. This mode of operation of the smart phone 700 is known as the PC Mode. The PC Mode supports high end applications which require more processing power and higher system resources. In PC Mode the smart phone 700 has the processing power and all the features present in a conventional computing device like laptop, etc. In the PC Mode, the smart phone 700 supports connection to external peripherals, like an external visual display unit, either through in-built ports or through a docking station (not shown in figure).

While in PC Mode, the cellular phone functionalities may be kept at a dormant state with the OS-D on the low configuration processor 704 operating in a very low powered mode, so as to keep the functionalities like receiving or making voice calls, etc., uninterrupted. The smart phone 700 also has facility of sharing of components among the high configuration processor 702 and the low configuration processor 704. For example, suppose the user is watching a video in the PC Mode which uses the display unit and the audio unit of the smart phone 700. Now, in case of an incoming call, the mobile phone mode may take over the control of either of the display unit and the audio unit or both the display unit and the audio unit so as to notify the user of the incoming call.

Additionally, while in the PC Mode, if the user receives a message or a call, the smart phone 700 can be configured to automatically switch to the mobile phone mode so as to facilitate the user to receive the call or the message. The switching between the mobile phone mode and the PC mode of the smart phone 700 is based on the concepts of operating system takeover 316. However, in one configuration, the smart phone 700, while in the PC Mode, may be configured to ignore events occurring in the mobile phone mode, like an incoming call. The smart phone 700 may also be configured to completely shutdown the mobile phone mode so as to facilitate the use of the smart phone 700 as a conventional computing device like laptop, in areas where usage of a communication device, like cellular phone, is not allowed like during flights.

Figure 8:
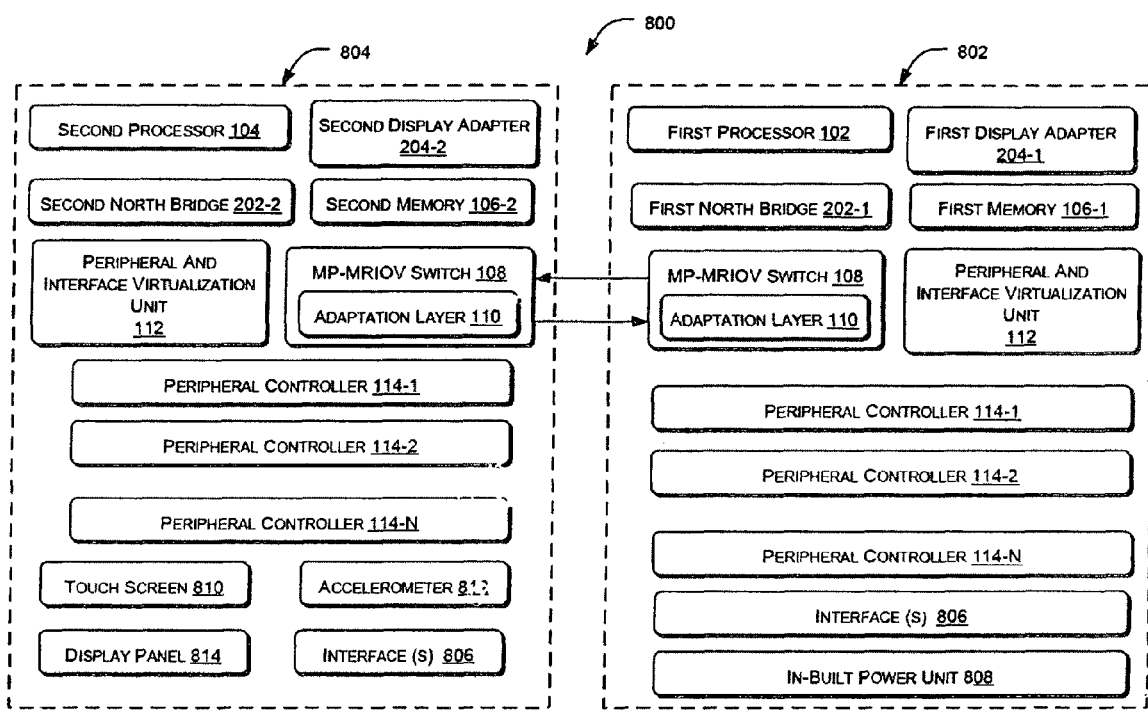
FIG. 8 illustrates an exemplary multi-processor laptop with detachable tablet, according to an embodiment of the present subject matter.

FIG. 8 illustrates an exemplary multi-processor laptop with detachable tablet, henceforth referred to as laptop-tablet 800, according to an embodiment of the present subject matter. In accordance with one embodiment of the subject matter, system 100 may be implemented as the laptop-tablet 800 and it will be appreciated that the concepts explained in context thereof may be extended to such an implementation.

The laptop-tablet 800 consists of a base unit 802 and a detachable unit 804. The base unit 802 has the first processor 102, the first north bridge 202-1, the first memory 106-1 coupled to the first processor 102 through the first north bridge 202-1, the first display adapter 204-1 connected to the first north bridge 202-1. The detachable unit 804 has the second processor 104, the second north bridge 202-2, the second memory 106-2 coupled to the second processor 104 through the second north bridge 202-2, the second display adapter 204-2 connected to the second north bridge 202-2.

Each of the base unit 802 and the detachable unit 804 has the MPMRIOV switch 108, the peripheral and interface virtualization unit (PVIU) 112, the plurality of peripheral controllers 114-1, 114-2, ... 114-N, one or more interface(s) 806. The detachable unit 804 has a display panel 814 with a touch screen 810, an accelerometer 812 to sense orientation of the detachable unit 804 and an inbuilt power source like rechargeable batteries (not shown in figure). The base unit 802 has an inbuilt power unit 808 which provides the base unit 802 with power and also facilitates connection to an external power supply either directly or through a power adapter or docking station, etc.

The base unit 802 and the detachable unit 804 can be connected together and used as a single device in the laptop mode; whereas when the detachable unit 804 is used as an independent system in a tablet mode.

In laptop mode the base unit 802 and the detachable unit 804 are connected to each other using the MP-MRIOV switch 108. The MP-MRIOV switch 108 supports both upstream and downstream data flow. In one example, the first processor 102 runs an operating system, laptop OS, and the second processor 104 runs another operating system, tablet OS. However both the first processor 102 and the second processor 104 may run the same operating system. When the laptop-tablet 800 is operated in the laptop mode, either of the first processor 102 or the second processor 104 or both the first processor 102 and the second processor 104 may be operational. The MP-MRIOV switch 108 enables the first processor 102 to use the resources present in the detachable unit 804 and similarly enables second processor 104 to use the resources of the base unit 802. This enables distribution of interface(s) 806 among the base unit 802 and the detachable unit 804, so that in laptop mode the laptop-tablet 800 may have the combined functionalities of both the units.

When in laptop mode the first processor 102 runs the laptop OS. The tablet OS may be powered off or may be kept running at a low power. All the resources present in both the units is accessible to the user through the laptop OS in this mode. When the detachable unit 804 is removed from the laptop-tablet 800 and used independently, the detachable unit starts functioning like a conventional tablet computer. The laptop-tablet 800 is configured to automatically synchronize essential files and folders among the two units so as to give the user a seamless experience during the transition of one mode from another.

Even after the laptop-tablet 800 is detached, the detachable unit 804 and the base unit 802 may work independently. After detachment of the detachable unit 804 and the base unit 802, file synchronization may continue through wireless connection between the detachable unit 804 and the base unit 802.

As an illustration, consider a user working on a presentation in laptop mode. The user may detach the detachable unit 804 and takes it to present the presentation. Since the laptop-tablet 800 synchronizes the files and folders between the two units, the user can continue his work and present the presentation in tablet mode without any interruption. Now suppose the user makes some changes in his work during the presentation, the user can save the changes on to a file in the base unit 802 through the wireless connectivity between the detachable unit 804 and the base unit 802. Alternatively when the user connects the detachable unit 804 to the base unit 802, laptop-tablet 800 automatically synchronizes the files and folders so that the user can continue his work in laptop mode from the same state in which he exited the tablet mode. Alternatively the user may specify files and folders to be synchronized or may manually synchronize between the base unit 802 and the detachable unit 804. In one implementation, a synchronization software tool may be run, on either the first processor 102 or the second processor 104, so as to maintain the same copies of user specified files and folders in both the base unit 802 and the detachable unit 804. Further, the synchronization software may be started when the user selects a software based safe detach option to safely detach the detachable unit 804 so as to prevent loss of data, data corruption, etc.

The laptop-tablet 800 may be operated in the tablet mode even when both the units are connected together. This can be achieved by putting the laptop OS in a low power mode and activating the tablet OS by user input facilitated through hardware or software or both. During this mode all the peripherals & interfaces connected to the laptop-tablet 800 like the keypad, mouse, hard disk drive, Ethernet card etc., may be directly accessible to the detachable unit 804 through the base unit 802.

The laptop-tablet 800 also allows simultaneous operation of the tablet OS and the laptop OS. In this case there can either be a display sharing or either of the units may use the inbuilt display panel and the other may be connected to an external display unit. Other peripherals may be shared by the two units either simultaneously or exclusively.

The detachable unit 804 may have its own power adapter or docking station, etc. to facilitate charging of its inbuilt power source. Alternatively the detachable unit 804 may be charged when both the units are connected together using the in-built power unit 808.

Though not explicitly shown, the detachable unit 804 and the base unit 802 may be connected through additional interfaces other than the PCIe connection through MP-MRIOV switch. During the connection and disconnection of the detachable unit 804 and the base unit 802, various access paths may be set up for example from first processor in the base unit 802 to the peripherals 114 in the detachable unit 804 or the second processor 104 in the detachable unit 804 to the peripherals 114 in the base unit 802. In one implementation, the access paths may be set up through dedicated communication channel, whereas in another implementation, the access channel may be set up through a shared communication channel. Further the communication channel between the detachable unit 804 and the base unit 802 may be set up by the MPMRIOV switch 108. In one implementation a Multi Root (MRPCI) manager may be configured to coordinate the communication between either of the detachable unit 804 and the base unit and peripherals 114. Alternatively the communication channel may be established through a dedicated interface connection between the detachable unit 804 and the base unit 802. For example, the communication channel can be established through I2C bus standard.

Though the detachable unit 804 and the base unit 802 have been described as components of the same system i.e. laptop-tablet 800, the same concept may be extended to independent devices connected to each other via a PCIe or PCI connector. For example, a computing device, say a laptop, may be connected to another computing device, say a mobile phone, using a PCIe connector. Further each of the connected computing devices can be configured to share its resources as well as use the resources of the other computing device, to which it is connected, simultaneously.

Thus the system 100 in itself and in its various embodiments like smart phone 700, laptop with detachable tablet 800 enhances the battery life without compromising on the processing power. The system 100 minimizes hardware redundancy by enabling sharing of peripherals among multiple operating systems running on multiple processors simultaneously. This increases the utilization of I/O devices and reduces power consumption by eliminating the need of multiple I/O devices for the same functionalities. Though the system 100 and its embodiments have been described using two processors, the same concept can be applied to systems having more than two processors.

Although implementations of multi-processor electronic systems have been described in language specific to structural features and/or methods, it is to be understood that the present subject matter is not necessarily limited to the specific features or methods described. Rather, the specific features and methods are disclosed as exemplary implementations for multi-processor electronic systems.

We claim:

1. A system comprising:
    a plurality of processors, wherein each of the plurality of processors is configured to run an operating system, such that a plurality of operating systems of the system comprises at least one of a homogeneous operating system or a heterogeneous operating system; and
    a multiprotocol multi-root input output virtualization (MP-MRIOV) switch communicatively coupled to at least one of the plurality of processors;
    an Inter Processor Communication unit (IPC) that is configured to enable message exchange between the plurality of processors, wherein the IPC facilitates inter-processor communication between at least two processors of the plurality of processors; and
    a peripheral and interface virtualization unit (PIVU) directly coupled to the MPMRIOV switch, wherein the PIVU is configured to communicatively couple at least one of the plurality of processors with at least one of a Peripheral Component Interconnect (PCI) compliant peripheral, a Peripheral Component Interconnect express (PCIe) compliant peripheral, a non PCI compliant peripheral or a non PCIe compliant peripheral, wherein the PIVU is configured to communicatively couple at least one of the processors from amongst the plurality of processors with at least one of the non PCI compliant peripheral or the non PCIe compliant peripheral by implementing at least one of a PCI register set or a PCIe register set, and wherein the system facilitates seamless switching from a first operating system of the plurality of operating systems to a second operating system of the plurality of operating systems.

2. The system as claimed in claim 1, wherein the plurality of processors comprises at least one of a homogeneous processor or a heterogeneous processor.

3. The system as claimed in claim 1, wherein the system further facilitates selection of one of the plurality of operating systems as a primary operating system.

4. The system as claimed in claim 1, wherein the system further facilitates concurrent operation of the plurality of operating systems.

5. The system as claimed in claim 1, wherein the system is further configured to facilitate at least one of a serial sharing or a parallel sharing of at least one peripheral among the plurality of processors.

6. The system as claimed in claim 1, wherein at least one of the plurality of processors is configured to exclusively control at least one peripheral.

7. The system as claimed in claim 1, further comprising a root port configured to communicative couple the system with one or more computing systems.

8. The system as claimed in claim 7, wherein the root port is further configured to facilitate sharing of at least one peripheral with one or more computing systems.

9. The system as claimed in claim 1, wherein the MPMRIOV switch is further configured to assign at least one peripheral to at least one of the plurality of processors in at least one of a shared mode or an exclusive mode.

10. The system as claimed in claim 9, wherein the assignment is further based in part on at least one of a user input, a request from at least one operating system, or a request from an application software.

11. A method for switching from a first operating system that is running on a first processor to a second operating system that is running on a second processor in a multi-processor system that includes a PIVU to communicatively couple at least one of the first processor or the second processor with at least one of a Peripheral Component Interconnect (PCI) compliant peripheral, a Peripheral Component Interconnect express (PCIe) compliant peripheral, a non PCI compliant peripheral, or a non PCIe compliant peripheral, the method comprising:

receiving an input to operate the second operating system that is running on the second processor while operating the first operating system that is running on the first processor;

context exchanging the first operating system that is running on the first processor;

switching the first operating system that is running on the first processor to a low power state; and operating the second operating system that is running on the second processor in a full power state.

12. The method as claimed in claim 11, wherein the low power state includes at least one of a stand by mode, a hibernation mode, or a shutdown mode.

13. The method as claimed in claim 11, wherein the switching further comprises transferring an ownership of at least one of the PCI compliant peripheral, the PCIe compliant peripheral, the non PCI compliant peripheral, or the non PCIe compliant peripheral from the first operating system to the second operating system.

14. The method as claimed in claim 11, wherein the receiving the input comprises at least one of a trigger or a user input, wherein the trigger comprises at least one of a power state of the multi-processor system or a docking status of the multi-processor system.

15. The method as claimed in claim 11, wherein the context exchanging further comprises transfer of information from the first operating system to the second operating system.

* * * * *